Nov. 24, 1936.　　　C. C. GUTHRIE　　　2,061,656
DECELERATOR
Filed July 11, 1931　　　2 Sheets-Sheet 1

INVENTOR
Charles C. Guthrie
By Green & McCallister
His Attorneys

Nov. 24, 1936.  C. C. GUTHRIE  2,061,656
DECELERATOR
Filed July 11, 1931   2 Sheets-Sheet 2

INVENTOR
Charles C. Guthrie
By Green & McAllister
His Attorneys

Patented Nov. 24, 1936

2,061,656

UNITED STATES PATENT OFFICE 2,061,656

DECELERATOR

Charles C. Guthrie, Pittsburgh, Pa.

Application July 11, 1931, Serial No. 550,057

1 Claim. (Cl. 188—90)

This invention relates to decelerators, and more particularly to a new and improved means of decreasing the speed of a machine, such as an automobile, with elimination of numerous disadvantages and dangers attendant upon the conventional mechanical braking systems now in general use.

The four wheel brake introduced new braking problems into the automotive industry, many of these problems centering around the fact that the front wheels of a motor car are driven only by the friction between the wheels and the road, whereas the rear wheels are turned by the engine through an intermediate drive shaft. This being true, it is apparent that an equal and sufficient braking force applied to all four wheels will cause the front members to lock, while the rear wheels continue to turn. The dangers and difficulties of a front wheel skid, as well as of skidding generally, are well known and need not be elaborated upon here. The economic loss in such, in wear on tires and working parts, is equally obvious.

In recent months the increasing popularity of free wheeling has necessitated additional attention to skidding problems. When the free wheeling device is operative, the car is in effect coasting, with all four wheels being driven substantially by their friction with the road. If weather or other conditions reduce this friction, as in the case of wet or icy pavements, a correspondingly smaller braking force will lock all four wheels and throw the machine into the worst kind of a skid. Again, if the device is inoperative, the same force may lock the front wheels and permit the rear to continue to rotate. Attempts at adjustment to meet this new factor in the equation, produce a situation even more unsatisfactory than that resulting when four wheel brakes alone were under consideration. If the brakes are adjusted so that more force is exerted on the rear wheels than the front, loss in braking efficiency on dry surfaces, where the friction between wheels and road is high, must result. Again, such an adjustment is difficult and uncertain, and becomes of little use when the rear wheels may become road driven at times and engine propelled at others. Rear wheel skids would be almost certain to occur under such an adjustment when the free wheeling mechanism was in engagement.

In view of the foregoing, the need of an effective braking means which will not under any circumstances lock the wheels, yet which will function positively and efficiently, is readily appreciated.

An object of this invention is to provide a decelerator that operates by viscosity resistance, and which in one of its forms is adaptable as a braking means for automobiles and the like.

Another object is to provide a non-locking, automatically equalizing brake.

A still further object is to provide an automatic cushioning or decelerating action within a braking device.

These and other objects made apparent throughout the further description of this invention are accomplished by means of my decelerator, which I shall proceed to explain in connection with the drawings herein, in which.

Figure 1:
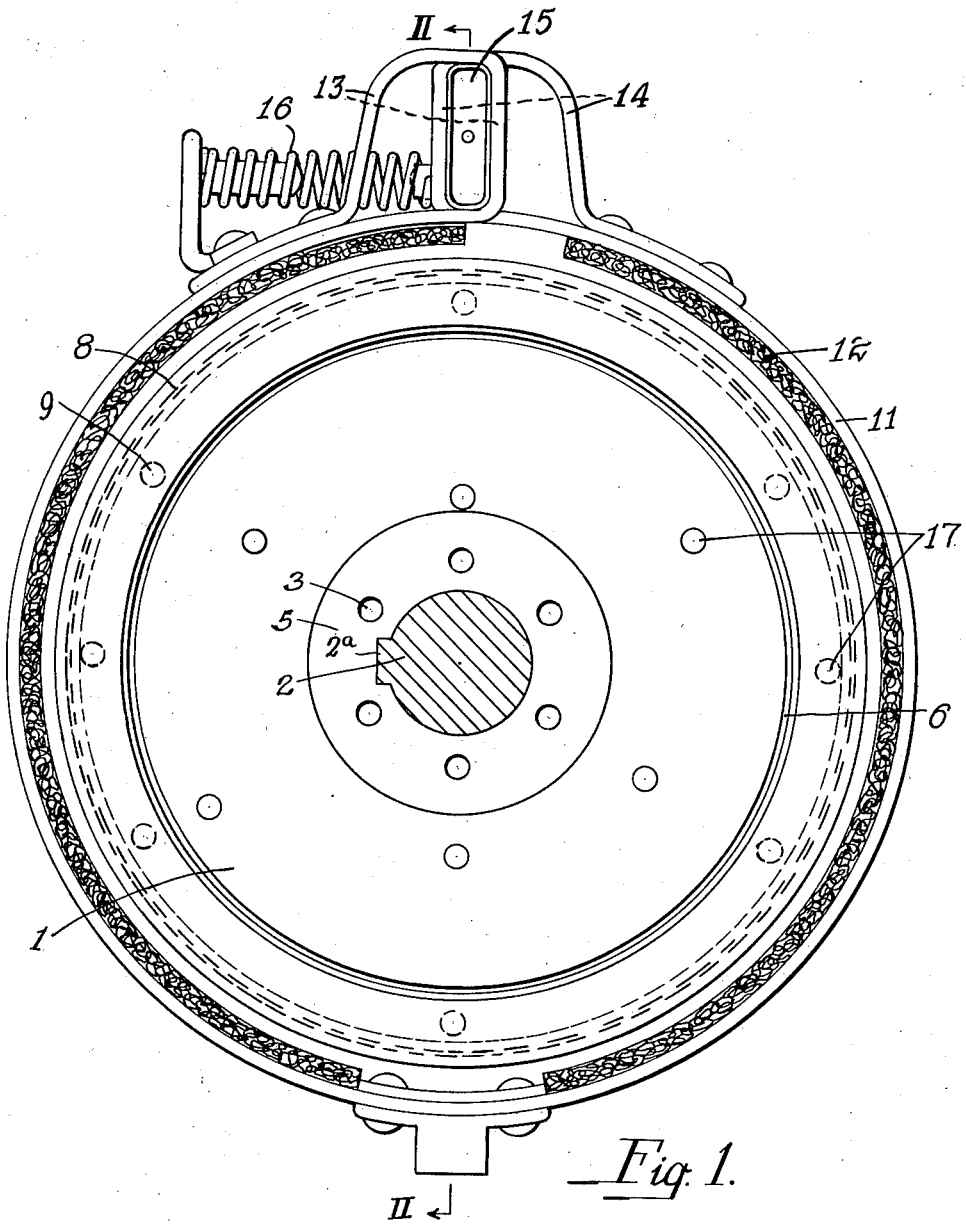
Fig. 1 is a side view of the device with part of the housing removed.
Figure 2:
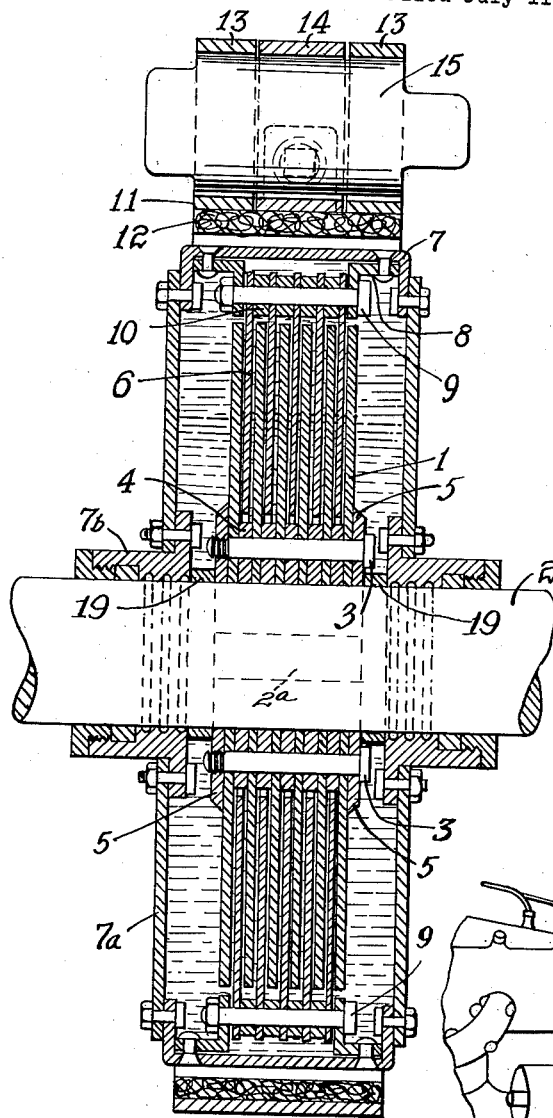
Fig. 2 is a view in cross section along the line II—II of Fig. 1.

Referring to the drawings, Fig. 2, a series of circular solid discs 1 such as saw blanks, is keyed or otherwise rigidly mounted on a driven shaft 2; suitable locking bolts or rivets 3 hold these blanks together with circular spacers 4 in a spaced relationship between hub portions 5. The hub portions 5 as well as the spacers 4 and discs 6 may be mounted on suitable longitudinally extending projections or splines 2a of the shaft 2, as shown in Figure 1, or may be in any other suitable manner secured thereto. The splines 2a are preferably formed in the usual manner with slightly tapered longitudinal sides. This not only permits the discs to be more readily removed, but also prevents them from changing their relative positions when securely mounted on the shaft 2. A second set of solid circular discs 6 is secured, adjacent their outer edges, to a rotatable casing 7 which surrounds and is concentric with shaft 2. Annular thrust bearing rings 19 mounted on shaft 2 and between hubs 5 and packing gland members 7d prevent axial movement of casing 7 and maintain the discs 1 and 6 of the rotor and casing respectively in fixed spaced relationship to each other. Discs 6 are of greater diameter than discs 1; are open at their centers to clear the spacers 4, and are so spaced, with relation to the spacing of those discs that they clear them as they rotate with the shaft. Discs 6 may be, adjacent their outer edges, mounted on rotatable casing 7 in any suitable way, the method shown here consisting of spacing the discs from the casing by attaching angle rims 8 to casing 7 by means of rivets and then passing bolts 9 through holes in the angle rims and discs. Supplementary spacers 10 may be employed between the discs to hold them in fixed and spaced relationship in a manner previously indicated. Side members 7a in the form of circular discs may be attached by appropriate means to member 7 to form a suitable housing for the disc assembly within. In order that the housing may be substantially liquid tight and at the same time permit the shaft 2 to rotate relatively thereto, a combined bearing and packing gland 7b, of any suitable form, may be employed between the housing covers 7a, the intent being to retain a viscous liquid such as a lubricant within the housing. That is, in the embodiment of my invention illustrated, the casing member 7 is journalled to rotate with respect to the shaft 2.

If operating or other conditions make greater protection for working parts desirable, it is possible to enclose the entire device, including the brake-band, within a separate and stationary housing, side members 7a being dispensed with in such a case, and the viscous liquid being permitted to circulate freely within said housing, the packing glands 7b being retained as an integral part thereof and preventing leakage therefrom. Although experiments have demonstrated that there is little excess heat generated in connection with the operation of my device, it is possible to reduce even this to a minimum by providing the housing with a large radiation surface.

To regulate the rate of deceleration, that is, to regulate the relative sympathetic rotation of one series of discs with relation to the other series of discs (more or less independently of the speed fluid-resistance curve), the peripheral face of casing 7 is surrounded by a brake-band 11 lined with a suitable brake lining material indicated at 12. This band may be supported and actuated in any suitable manner, purely illustrative means being disclosed herein in order that the device may be fully understood, said means consisting of bifurcated loops 13 formed at one end of the brake-band, and a looped tongue 14 formed at the opposite or opposing meeting end. Loops 13 and 14 are aligned to receive a relatively flat bar or lever 15, which member when turned sideways in response to actuating mechanism, such as a foot pedal and intermediate connecting rods for example, serves to force loops 13 and 14 into further engagement. This action results in brake-band 11, or more strictly speaking, the lining 12 thereof, being brought into contact with brake-drum 7, the pressure extent of which contact determines in part the rate of deceleration established by the device, as will be explained more in detail hereafter. A spring 16 acts as a release means, and serves to keep the brake-band in a normally non-contacting position as to brake-drum 7.

Contained in the housing surrounding my device and in intimate contact with the faces of discs 1 and idler discs 6, is a liquid of suitable viscosity and minimum variation in response to changes in temperature. Selected oils or glycerine are examples of such liquids. In order that this braking fluid may have free and uninterrupted passage around and over the effective surfaces of the device, discs 1 and 6 are provided at intervals with holes 17, the number and location of which is a matter of discretion. A particular advantage in the employment of a fluid braking medium lies in the fact that such may be renewed periodically as it is worn out or exhausted, and that such renewal in effect restores the device to original efficiency. The wear is on the viscous material to a much greater extent than upon the mechanical elements comprising the device. Advantages resulting from this fact are obvious.

In operation my device works as follows: Assuming that shaft 2 is attached to a source of energy and is being rotated thereby, or has achieved such a movement through the transmission of energy thereto, it is apparent that casing 7 will have assumed a like movement, the viscous material between the interleaving discs 1 and 6 setting up such a resistance as to cause the entire member to be rotated, rather than merely the inner portion thereof. If it becomes necessary or desirable to decelerate shaft 2, the mechanism that contracts band 11 is actuated and the lining 12 brought into contact with the face of brake-drum or casing 7. The friction thereby created will first slow the movement of said casing, with an attendant decelerating effect upon the shaft 2, and, as increased pressure is applied, stop the rotation of the casing and discs 6 altogether. An effective braking means is thereby achieved, as the interleaving discs 1 and 6, being submerged in a viscous liquid, absorb energy to such an extent that the rotation of shaft 2 is either stopped entirely or appreciably slowed down, the latter result taking place if energy still continues to be furnished to the shaft from an outside source.

Figure 3:
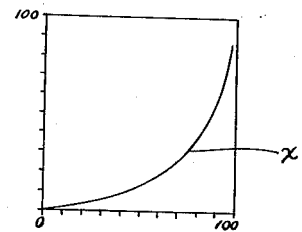
Fig. 3 is a diagram indicating the braking characteristics of the instant invention; and, Fig. 4 is a side view more or less in perspective showing my device mounted on the drive line of an automobile.

A particular advantage of my device is illustrated in Fig. 3, which is a chart or diagram showing the action of the decelerator in relation to the speeds of rotation of a shaft, the latter being plotted as abscissas, and the braking moments or resistance as ordinates. The curve $x$ discloses that the decelerating effect increases rapidly as higher shaft speeds are encountered, but is less marked at the lower speeds. This fact leads to the conclusion that the device is effective to arrest the rotation of the shaft when traveling at high speed, yet will not, and in fact cannot, lock the shaft when the speed thereof has been substantially reduced. This fact is particularly significant when considered in connection with the braking system of an automobile, it being apparent that my device will check the speed thereof, yet never lock or skid the wheels, as the contact of the wheels with the road, however slight, will always furnish enough friction to turn the wheels. In connection herewith, it should also be noted that the decelerating action of my device is a graduated and automatically cushioned process, it being impossible to cause an abrupt jar or impact by application of the braking means as in the case of conventional mechanical devices now in use. My brake takes hold in the manner indicated by the curve $x$ in Fig. 3, the principle of viscosity resistance accounting for this, and in fact, permitting it to function in no other manner. When a disc-like blade is rotating in a fluid medium, the inertia manifesting itself in the tendency of the fluid particles to move away from the center of roation of the disc is called centrifugal force. A study of this force discloses that it produces a conical or cylindrical-like whirling action upon the fluid adjacent opposite sides of the rotating disc and extending a distance therefrom dependent upon the rotative speed or velocity of such disc. That is, a submerged disc upon being rotated within a body of fluid such as oil, will cause conic-like action adjacent opposite faces thereof in line with the axis of rotation.

When a second disc-like blade is rotated in an opposite direction adjacent the first-mentioned blade, the conic-like, whirling action of the fluid particles produced by one blade will oppose the particles activated by the other blade, particularly those particles which are set in motion by the face of each disc immediately opposed to the face of the other. As previously pointed out, the longitudinal as well as the transverse extent of the whirling particles of the fluid depends upon the rotative speed of a given disc. Thus, it appears, that for a given speed, a disc produces a certain form of distortion upon the surrounding fluid. For slow speeds, therefore, this distortion will lie relatively close to the center of the faces and adjacent the axis of rotation of a disc-like blade; and, for this reason, if another and an opposed blade is utilized, such must be positioned very close to the first blade, if the oppositely-set-up adjacent whirling forces are to appreciably oppose or buck each other. It is also apparent that if the opposed blades are moved to such a close proximity that the conic-like shape of the whirling particles caused by one blade is distorted or compressed by the limiting action of the opposite blade, that the opposite forces will be distorted transversely with respect to the rotative axes and that the previous longitudinally extending action will be distorted transversely. The two opposing and oppositely-directed whirling actions are thus both distorted or compressed outwardly by the opposed blades, and thus, also more effectively act in opposition to each other.

The above principles have been discovered and put to a definite practical application for the first time, in order to provide an efficient and effective decelerator for automobiles and like vehicles which are designed to move at extremely high velocities, and which will, therefore, set up exceptionally high pressures upon decelerator blades. The increase in pressure upon rotating portions of a decelerator device with an increase of speed of the vehicle of course follows from the fact that the resistance encountered is not at all independent of the velocity, as in the case of solid friction, but increases for slow speeds at nearly the square of the velocity and for high speeds at a rate considerably greater.

I have been able to provide a practical form of decelerator apparatus for high speed vehicles, such as automobiles, which will effectively withstand the pressures involved and will also efficiently dissipate the heat generated by a confined fluid without damage to such apparatus. In other words, I have utilized the above principles, in order to, for the first time, provide an effective apparatus for automobiles. I have found that if the spacing between the discs, by this I mean opposed discs, is sufficiently small to afford a maximum resistance by the fluid to the rotation of one disc with respect to adjacent discs, the thickness of the discs should be greater than the spacing, so that they may withstand the pressures involved, and especially, those pressures set up at extremely high speeds. That is, I have found that as long as the blade thickness is kept greater than the distance between adjacent discs, the construction will always be safe in view of the temperature, pressure and other structural requirements.

Figure 4:
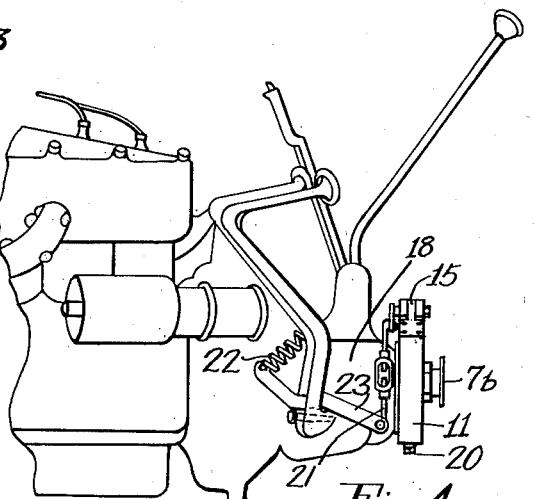

Attention is now directed to Fig. 4, which represents one method of attaching my decelerator to an automobile. The device may be mounted anywhere on the drive line, or, for that matter, in conjunction with each of the four wheels of a car, but I have shown herein an installation just to the rear of the gear case, said gear case being indicated by the numeral 18. In such an installation the disc assemblage is locked to the drive shaft, viscous fluid placed within the housing, and the shaft hole in the cover sealed by a packed bearing or other suitable means. The brake-band lever may then be attached to a foot pedal or other actuating member by intermediate connecting rods and the brake band itself anchored in any conventional manner. Although the operating lever connection 15—21—23, shown in Fig. 4, aids in holding the brake band 11 in position, yet it is advisable to provide a bracket (not shown) which is adapted to extend from a stationary portion of the apparatus, i. e., the gear case 18. The bracket will preferably be slotted to receive the lug 20, and thus, support and prevent rotation of the brake band 11. Any other conventional structure known to the art may be employed as the specific method of anchorage is not a part of my present invention. If my device is used in connection with the regular service brakes of a motor car, it is possible to so adjust and correlate the two systems as to have the force of the decelerator become substantially effective before the other brakes are brought into play. This is accomplished by simply connecting the two systems in sequence so that the decelerator is actuated to any desired degree before the further movement of the pedal makes the additional braking means effective. Such an arrangement is particularly practicable in connection with free wheeling, where a proportionately greater amount of braking is necessary, my device making possible effective and efficient deceleration for ordinary purposes without the usual wear and tear on regular braking parts. When backed up by ordinary brakes, nothing is sacrificed in the way of safety, yet a more smoothly operating and economical braking system is achieved.

Although, for the purposes of illustration, I have shown the housing or casing 7 as completely filled with the decelerating viscous fluid such as oil, yet I have found that such is not necessary in that capillarity will at all times insure fullness of the viscosity spaces between the disks during their use. Further, it will readily be seen that, although I have shown a rotating casing or housing 7, my novel form of decelerating action will be accomplished whether such housing is rotatably or fixedly mounted.

Of course, relative movement between discs 1 and 6, as applied to the speed-viscosity curve of Fig. 3, is what accomplishes the result.

Although my invention has been disclosed herein principally in connection with an automobile or similar mechanism, it is apparent that it may be used for reducing the speed of almost any machine, by viscosity resistance, and I do not intend to limit myself specifically to the use indicated herein.

What I claim as new and desire to secure by Letters Patent is:

In a high speed self-propelled vehicle such as an automobile, a decelerator adapted to be mounted upon a longitudinally extending drive shaft of such automobile, annular hub portions securely mounted on said shaft, a series of discs, a plurality of annular spacers between each disc of a series adjacent their centers, locking bolts adapted to extend through said hub portions and through said discs and spacers for securing them as an assembly to said shaft for rotation therewith, a housing concentric with said shaft and rotatable with respect thereto, a plurality of angle elements mounted upon said housing and extending inwardly therefrom, a second series of discs securely mounted on said angle elements circumferentially of said housing, a plurality of spacers between each of said discs adjacent said angle elements, means securely mounting said second series of discs and said last mentioned spacers adjacent their outer circumferences upon said angle elements for rotation with said housing the discs of each series having a spaced and parallel relationship with respect to each other and also having an interleaving relationship with respect to discs of the other series, said first-mentioned series of discs being maintained in a spaced relationship with respect to said second-mentioned series for preventing frictional engagement therebetween, a body of viscous fluid interposed between and disposed about said interleaving discs, so that a rotation of one series may be opposed through the viscosity resistance of said fluid by the other series of discs, the spacing between said discs being sufficiently small to afford a maximum resistance of the fluid to the rotation of each disc with respect to adjacent opposed discs, the thickness of both series of discs being greater than the spacing between adjacent discs, so that the discs may withstand the increased pressures involved, brake means cooperating with said housing for variably holding it against rotative movement with respect to said shaft, so that the viscosity resistance of said fluid may decelerate the rotation of said shaft in accordance with a speed resistance curve.

CHARLES C. GUTHRIE.